United States Patent
El-Tahlawy et al.

(10) Patent No.: US 12,325,215 B2
(45) Date of Patent: Jun. 10, 2025

(54) ROOF UNDERLAYMENT

(71) Applicant: Shurtape Technologies, LLC, Hickory, NC (US)

(72) Inventors: Khaled El-Tahlawy, Hickory, NC (US); Ameet Kulkarni, Hickory, NC (US)

(73) Assignee: Shurtape Technologies, LLC, Hickory, NC (US)

( * ) Notice: Subject to any disclaimer, the term of this patent is extended or adjusted under 35 U.S.C. 154(b) by 429 days.

(21) Appl. No.: 17/782,013

(22) PCT Filed: Dec. 2, 2020

(86) PCT No.: PCT/US2020/062922
§ 371 (c)(1),
(2) Date: Jun. 2, 2022

(87) PCT Pub. No.: WO2021/113385
PCT Pub. Date: Jun. 10, 2021

(65) Prior Publication Data
US 2023/0020860 A1    Jan. 19, 2023

Related U.S. Application Data

(60) Provisional application No. 62/942,460, filed on Dec. 2, 2019.

(51) Int. Cl.
*B32B 27/12*    (2006.01)
*B32B 5/02*    (2006.01)
(Continued)

(52) U.S. Cl.
CPC ............ *B32B 27/12* (2013.01); *B32B 5/022* (2013.01); *B32B 27/20* (2013.01); *B32B 27/302* (2013.01);
(Continued)

(58) Field of Classification Search
None
See application file for complete search history.

(56) References Cited

U.S. PATENT DOCUMENTS 8,563,100 B1 * 10/2013 Zhou ................. B32B 27/10
428/32.2
2011/0097954 A1 * 4/2011 Bone ................. B32B 5/24
156/331.7
(Continued)

FOREIGN PATENT DOCUMENTS

WO    WO-2014158347 A1 * 10/2014    ............ B32B 27/10

*Primary Examiner* — Arti Singh-Pandey
(74) *Attorney, Agent, or Firm* — Lippes Mathias LLP

(57) ABSTRACT

An air and water barrier article comprised of multiple layers. The layers include a porous layer, a polymeric layer disposed on a front side of the porous layer, and a pressure sensitive adhesive disposed on a second side of the porous layer. In certain embodiments, a top polymeric layer having hydrophobic and UV resistant properties will be provided on a surface of the first polymeric layer opposite the adhesive layer. Each of the polymeric layers and the porous layer can be formed of a material(s) having a Tg between −40° C. and 20° C. The top layer, if present, can have a Tg between −5 and 30° C. The barrier article can provide nail seal ability and have a weight of less than 30 ounces per square yard.

11 Claims, 1 Drawing Sheet

(51) Int. Cl.
   *B32B 27/20* (2006.01)
   *B32B 27/30* (2006.01)
   *E04D 12/00* (2006.01)

(52) U.S. Cl.
   CPC .......... *B32B 27/306* (2013.01); *B32B 27/308* (2013.01); *E04D 12/002* (2013.01); *B32B 2260/021* (2013.01); *B32B 2260/046* (2013.01); *B32B 2260/048* (2013.01); *B32B 2262/0246* (2013.01); *B32B 2262/0261* (2013.01); *B32B 2262/101* (2013.01); *B32B 2262/106* (2013.01); *B32B 2307/3065* (2013.01); *B32B 2307/7242* (2013.01); *B32B 2307/7265* (2013.01); *B32B 2307/73* (2013.01); *B32B 2307/744* (2013.01); *B32B 2419/06* (2013.01)

(56) References Cited

U.S. PATENT DOCUMENTS

2018/0001595 A1* 1/2018 Seabaugh ................ C09J 7/405
2018/0354230 A1* 12/2018 Zhao ....................... B32B 27/20

\* cited by examiner

ROOF UNDERLAYMENT

This application claims the benefit of U.S. Provisional Application Ser. No. 62/942,460 filed Dec. 2, 2019, the disclosure of which is hereby incorporated by reference.

BACKGROUND

The present disclosure relates to easy to apply air and water barrier articles and rolls thereof. The present disclosure is also related to a self-adhering air and water barrier article. It finds application as a roof underlayment and will described via an exemplary embodiment thereof. However, it is to be appreciated that the exemplary embodiment is also amenable to other applications.

Air and water barrier systems control movement of air, water and water vapor across a surface of a structure, such as a building enclosure. Barrier systems protect the building structure and have significant impact on energy consumption.

An underlayment material is commonly used in roofing applications as well as other underlayment situations. The typical product utilized in roofing underlayment is commonly referred to as "tar" of "felt" paper. The traditional "tar paper" is an asphalt impregnated paper product which is sold in a roll; unrolled on a roof; cut to length; and fastened to the roof utilizing staples or nails. Although tar paper is inexpensive, it does not seal nail holes through the paper and thus does not prevent water infiltration. In addition, once the felt is rolled out, it absorbs water and once wet, it wrinkles and expands, and must be allowed to dry before being covered with shingles. Other prior art shingle underlayment products also suffer from similar problems.

Accordingly, what is needed is a generally low cost, dimensionally stable underlayment product on which the installer can walk, without sticking or slipping, which will not slide underfoot and which will cold flow and/or elongate and recover to seal nail holes and other punctures. In addition, such product should resist tearing, be non-adhesive to other layers, and provide hot and cold flexibility.

It is beneficial for such moisture-vapor permeable waterproofing underlayment product to pass ASTM D-1970/D-1970M-13 or similar modified tests such as Modified Test 1 of ASTM D-1970/D-1970M-13, Modified Test 2 of ASTM D-1970/D-1970M-13, or Modified Test 3 of ASTM D-1970/D-1970M-13 for nail sealability.

Accordingly, a desirable roof underlayment can be a multi-layer structure providing at least nail seal ability and optionally antiskid, UV resistance, and fire resistance.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, an air and water barrier article comprised of multiple layers is provided. The layers include a porous layer having a polymeric saturant. A polymeric layer is disposed on a side of the porous layer. A pressure sensitive adhesive is disposed on a side of the polymeric layer opposed to the porous layer. The polymeric layer and the porous layer are comprised of a material having a Tg between −40° C. and 40° C. The barrier article has a nail sealability satisfying ASTM D-1970/D-1970 M-13 and has a weight of less than 40 ounces per square yard.

According to a second embodiment, an air and water barrier article is provided. The article has application as a roof underlayment. The article includes multiple layers including a porous intermediate layer. A first polymeric layer is disposed on a front side of the porous layer. A second polymeric layer is disposed on a back side of the porous layer. A pressure sensitive adhesive is disposed on a side of the second polymeric layer opposed to the porous layer. Each of the polymeric layers and the porous layer are comprised of a material having a Tg between −40° C. and 40° C. The barrier article has nail sealability and a weight of less than 40 ounces per square yard.

The barrier article can be in the form of a roll. In some embodiments, a width of the article is greater than or equal to 18 inches or greater than 40 inches.

The barrier article can include an additional polymeric layer disposed on a side of the first polymeric layer opposed to the porous layer. The additional layer can be hydrophobic. The additional polymeric layer can be a styrene acrylic including a hydrophobic acrylate and/or polyvinylidene fluoride and can optionally include ethylene vinyl acetate. The additional polymeric layer can also include at least one of calcium carbonate, a UV absorber, and a fire retardant.

The porous layer can comprise a nonwoven polymerically saturated polypropylene and/or polyester. The saturation polymer can be one or both of a styrene acrylic polymer and/or a styrene butadiene polymer, optionally in combination with calcium carbonate.

Saturation can be achieved by a dip and nip process. More particularly, in certain embodiments, the porous layer can be enhanced with a saturant to provide improved properties. For example, the porous layer can be fed through a batch of the low viscosity saturant polymer (dip), squeezed between rollers or blades (nip), and then dried. Advantageously, the saturant polymer fills the interstices of the porous layer.

The first and second polymeric layers can be comprised of at least one of styrene acrylic polymer and styrene butadiene rubber. The first polymeric layer can optionally include a filler such as calcium carbonate. The second polymeric layer does not require a filler.

The pressure sensitive adhesive can be a UV curable acrylic. The pressure sensitive adhesive can be protected by a release liner. In some embodiments, a release strength between the second major surface of the release liner and the pressure sensitive adhesive is less than or equal to a release strength between the first major surface of the release liner and the second major surface of the article. In some embodiments, the liner is coated on at least one of the major surfaces with a release coating.

In some embodiments, the roll includes surface modification at the interface between the second major surface of the article and the first major surface of the adhesive. For example, the back side major surface of the barrier article may include an overlaid or overcoated low surface energy release layer or low adhesion back size (LAB).

According to a further embodiment, an air and water barrier article comprised of multiple layers is provided. The layers include a first layer comprised of styrene-butadiene rubber, styrene acrylic polymer, and/or ethylene-vinyl acetate polymer. The first layer has a Tg between 40° C. and −40° C. A second layer comprised of a non-woven or fleece material is also provided. The material of the second layer can be saturated with styrene-butadiene rubber, styrene acrylic polymer, or ethylene-vinyl acetate polymer. The second layer has a Tg between 40 and −40° C. In addition, a third layer is provided. The third layer can be comprised of styrene-butadiene rubber, styrene acrylic polymer, or ethylene-vinyl acetate polymer. The third layer has a Tg between 40 and −40° C. A pressure sensitive adhesive can be disposed on one of the first or third layers which includes no filler. The other of the first and third layer includes a filler.

According to a further embodiment, an air and water barrier article is provided. The article includes multiple layers including a top layer having water repellency, UV resistance, slip resistance. A first intermediate layer is formed of a water dispersion polymer which can be selected from styrene acrylic, styrene butadiene ethylene vinyl acetate, nitrile rubber, polytetraluorethylene (PTFE), polychloroprene, ethylene propylene diene monomer rubber, polyvinyldene fluoride, etc. including a filler and having a Tg between −40 and −15° C. A middle layer of a non-woven or fleece material saturated with styrene-butadiene rubber, styrene acrylic polymer, or ethylene-vinyl acetate polymer and having a Tg between 20 and −40° C. is also provided. A pressure sensitive adhesive layer is is also provided.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
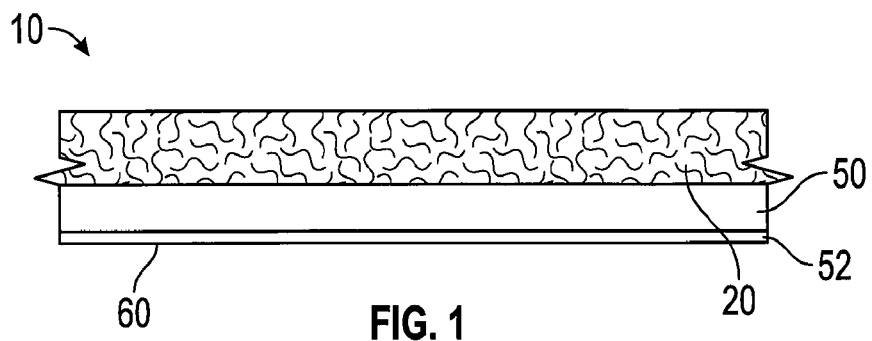
FIG. 1 is a side cross-section view of an exemplary embodiment of the roof underlayment of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms about, generally and substantially are intended to encompass structural or numerical modifications which do not significantly affect the purpose of the element or number modified by such term.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Referring now to FIG. 1, air and water barrier 10 includes a porous layer 20 disposed upon a polymeric layer 50. A layer of pressure sensitive adhesive 60 is disposed on outer surface 52 of the polymeric layer 50.

In some embodiments, the pressure sensitive adhesive is discontinuously disposed on the surface. In some embodiments, the pressure sensitive adhesive covers 10% to 90% of the surface area of the outer major surface 52 of the polymeric material 50. In some embodiments, the pressure sensitive adhesive is a permeable pressure sensitive adhesive that is continuously disposed on at least one outer major surface 52 of the polymeric material 50.

Any pressure sensitive adhesive used to adhere air and water barrier articles to architectural structures (e.g., buildings) may be used. These include both vapor permeable and vapor impermeable pressure sensitive adhesives. An example of the latter is a rubber modified asphalt (bitumen) pressure sensitive adhesive or a synthetic rubber pressure sensitive adhesive. Such pressure sensitive adhesives are well known in the art.

In some embodiments, the adhesive is selected to be a solvent-less or hot melt adhesive. In some embodiments, solvent based adhesives or water-based adhesives may be used. Exemplary types of adhesives include, radiation-cured, e.g., ultraviolet (UV) radiation or electron-beam cured. The applied adhesive is preferably tacky (i.e. sticky) and pressure sensitive.

Solvent-less pressure sensitive adhesives may contain (meth)acrylic homopolymers and copolymers, such as for example isooctyl acrylate, 2-ethylhexyl acrylate. In addition, polar comonomers can be included, such as for example acrylic acid, itaconic acid, 2-carboxy ethyl acrylate, acrylamide and its substituted derivatives. Optional additives include tackifiers, pigments, fillers, UV stabilizers, flame retardants, thixotropic agents, viscosity modifiers, and the like.

Suitable hot melt adhesives may contain such ingredients as (co)polymers such as butyl rubber, styrene-butadiene-styrene (SBS), styrene-isoprene-styrene (SIS), styrene butadiene (SB), styrene-ethylene-butadiene-styrene (SEBS) and ethylene/vinyl-acetate (EVA); and (meth)acrylic homopolymers and copolymers.

In some embodiments, the porous layer is a perforated polymeric material. In some embodiments, the perforated polymeric material is selected from polyolefin, oriented polyolefin, polyester, oriented polyester, acrylic, multilayer films and combinations thereof. The porous layer can be comprised of material(s) having a Tg between 20 and −40° C.

In some embodiments, the porous layer is a nonwoven selected from at least one of polyester, polylactic acid, polyolefin, polyamide, rayon and combinations thereof. In some embodiments, the porous layer comprises blown microfibers.

In some embodiments, the porous layer has a fleece or a stitch bond structure. In some embodiments, the porous layer is fiberglass or carbon fiber.

In some embodiments, the porous layer includes at least one of the following materials: extruded netting, scrims, and the like. In some embodiments, the porous layer may have a layer of warp knit or stitch bonding.

In some embodiments, the porous layer is saturated with a polymer dispersion. Saturation can be achieved using the dip and nip process. A water dispersed polymer is a suitable example of a polymer dispersion. Specific examples include styrene acrylic polymer or styrene butadiene polymer or ethylene vinyl acetate. In some embodiments, the saturation polymer includes a filler such as calcium carbonate The polymeric material(s) forming the bottom layer 50 can impart strength and nail sealablility. Examples of suitable polymer dispersions can include polymers and co-polymers of vinyl acetate, vinyl chloride, acrylics, acrylonitrile, ethylene, styrene, butadiene, isoprene, poly (vinyl alcohol), polyvinyl chloride (PVC), polyurethane, a styrene-acrylic acid, EPDM or nitrile rubber, and vinylidene chloride. In one or more embodiments, the thermoplastic polyolefin polymers may include an olefinic reactor copolymer. The bottom layer 50 can be formed of materials having a Tg between −20 and −40° C.

It should be noted that the above description of the various layers is equally applicable to the similar layers described in the embodiments that follow. In fact, the description herein of the various layers in each of the various embodiments is suitable for incorporation or substitution with/for a similar layer in an alternate embodiment.

Figure 2:
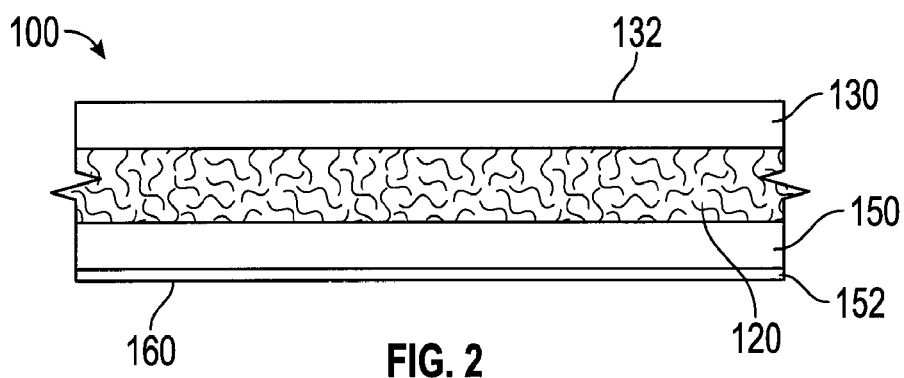
FIG. 2 is a side cross-section view of an alternative embodiment of the roof underlayment of the present disclosure.

Referring now to FIG. 2, air and water barrier article 100 includes a porous layer 120 encapsulated with polymeric material 130 and polymeric material 150. The air and water barrier article 100 also includes a layer of pressure sensitive adhesive 160 useful for adhering the air and water barrier article to various surfaces. The pressure sensitive adhesive can be disposed on at least one of the outer major surfaces 132, 152 of the polymeric material 130, 150.

The polymeric material(s) forming the upper layer 130 can be provided to have UV resistance, water repellency and anti-slip properties. The polymeric material(s) forming upper layer 130 can have a Tg greater than 0° C. Examples of suitable materials include polymers and co-polymers of vinyl acetate, vinyl chloride, acrylics, acrylonitrile, ethylene, styrene, butadiene, isoprene, poly (vinyl alcohol), polyvinyl chloride (PVC), polyurethane, a styrene-acrylic acid, and vinylidene chloride. In one or more embodiments, the thermoplastic polyolefin polymers may include an olefinic reactor copolymer. Reactor copolymers are generally known in the art and may include blends of olefinic polymers that result from the polymerization of ethylene and α-olefins (e.g., propylene) with sundry catalyst systems.

The polymeric material(s) forming the bottom layer 150 can impart strength and nail sealablility. Examples of suitable polymer dispersing can include polymers and co-polymers of vinyl acetate, vinyl chloride, acrylics, acrylonitrile, ethylene, styrene, butadiene, isoprene, poly (vinyl alcohol), polyvinyl chloride (PVC), polyurethane, a styrene-acrylic acid, EPDM or nitrile rubber, and vinylidene chloride. In one or more embodiments, the thermoplastic polyolefin polymers may include an olefinic reactor copolymer. The bottom layer 150 can be formed of materials having a Tg between −20 and −40° C.

In one or more embodiments, the layers 20, 50, 120, 130 and 150 may be individually constructed to include multiple layers.

The composite barrier article 100 is ideally suitable for building construction. It is generally light weight, preferably less than 30 ounces per square yard, and more preferably between 26 and 36 ounces per square yard and can be disposed on building sidewalls or a roof.

When used as an underlayment for attachment to a roof, the composite substrate 100 can be rolled over the roofing sheathing and stapled thereto. Additional layers of tar paper are not necessary since the composite substrate 100 has water resistance properties. The composite substrate 100 can also be configured into tapes or smaller rolls.

Figure 3:
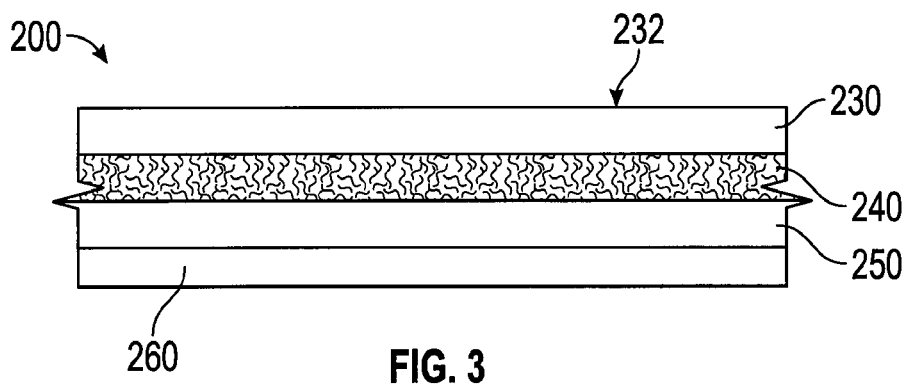
FIG. 3 is a side cross-section view of a further alternative embodiment of the roof underlayment of the present disclosure.

Referring now to FIG. 3, a further alternative embodiment of a composite substrate 200 is provided. In this embodiment, a top layer 230 provides UV resistance, water repellency and low-slip characteristics at surface 232.

The middle layer 240 can be a nonwoven material saturated with water dispersed polymer which can be selected from styrene butadiene rubber or acrylic polymer (e.g. styrene acrylic) or ethylene vinyl acetate or nitrile rubber, or PTFE, or polychloroprene, or EPDM, or polyvinylidene fluoride. This layer might contain fillers.

Some specific filler examples include ground or light calcium carbonate (with or without a surface-treatment such as a fatty acid, resin acid, cationic surfactant, or anionic surfactant); magnesium carbonate; talc; sulfates such as barium sulfate; alumina; metals in powder form (e.g., aluminum, zinc and iron); bentonite; kaolin clay; quartz powder; titanium dioxide and combinations of two or more.

The middle layer 240 can provide structure and support nail sealability. The Tg of the polymers forming the middle layer can be between −15 and −40° C.

The bottom layer 250 can be styrene butadiene rubber or an acrylic polymer (e.g. styrene acrylic) or ethylene vinyl acetate. Other suitable polymers are those identified with respect to layers 50, 130 and 150 above. This layer preferably does not contain fillers. This layer provides nail sealability. The Tg of the polymers forming the bottom layer can be between −20° C. and −40° C.

An adhesive layer 260 (e.g. UV acrylic adhesive) can form an outer surface of the composite substrate 200. A release liner can also be provided.

Figure 4:
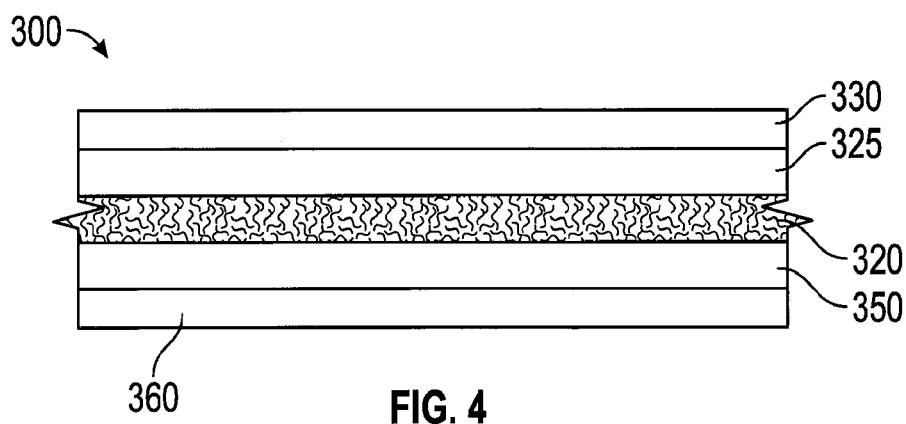
FIG. 4 is a side cross-section view of an additional alternate embodiment of the roof underlayment of the present disclosure.

With reference now to FIG. 4, a further embodiment of the present disclosure is provided. The composite substrate 300 can include a top layer 330 that can be a water repellant surface that is comprised, for example, of a styrene acrylic base polymer with a hydrophobic acrylate. Top layer 330 can include optional filler and/or colored pigment and/or UV resistant addition. This enables water repellency combined with UV resistance and slip resistance. The glass transition temperature of the styrene acrylate base polymer can be between −15° C. and −40° C.

The polymeric materials of the present disclosure may further include UV stabilizers or antioxidants. Useful UV stabilizers and antioxidants include those available under the trade designations "TINUVIN 770", "TINU-VIN 327", "TINUVIN 1130" and "TINUVIN 292" from Ciba-Geigy. Anti-slip protection can be provided by incorporating particles of aluminum oxide, silica, and/or garnet or other materials known to the skilled artisan.

An intermediate layer 325 can be a styrene acrylic base polymer or styrene butadiene polymer with a glass transition temperature that is between −40° C. and −15° C. The polymer can be blended with calcium carbonate filler (particle size 2 microns to 15 microns on average) at a ratio of 1-part polymer: 0.5-2.0 parts calcium carbonate. This layer imparts cold temperature flexibility and nail sealability. The weight of the intermediate layer can be 4 to 15 oz/yd2. This layer may optionally include black or white pigment.

A saturated nonwoven layer 320 can be a polypropylene or polyester nonwoven saturated with a polymer. The weight of the nonwoven can be 50-150 grams per square meter. The nonwoven layer can be saturated with a water dispersed polymers such as styrene acrylic base polymer, styrene butadiene rubber and/or ethylene vinyl acetate. The nonwoven layer can have a glass transition temperature of −40 to −15° Celsius. This polymer can be blended with calcium carbonate filler. This layer provides tensile strength, tear resistance and cold temperature pliability.

An underlayer 350 can be either a styrene acrylic or crosslinked styrene butadiene polymer or polyvinylidene chloride polymer that does not have any filler. This layer can act as an air, vapor and water barrier.

A UV curable acrylic pressure sensitive adhesive 360 can be employed. Additionally, a release liner can be provided to protect the adhesive layer.

It is noted that with respect to each of the embodiments described above, it is a general construct of the disclosure that each layer can include a crosslinking agent, a hydrophobic additive and/or a filler. Often all three ingredients will be present; however, at least one layer in a four or greater layer system (most typically a layer other than the saturated porous layer) will not include a filler.

Exemplary fillers are described above. Exemplary crosslinking agents can include carbododiimide, melamine formaldehyde, ammonium zirconium dicarbonate, polyaziridine, urea formaldehyde, and others known to the skilled artisan. Exemplary hydrophobic additives include paraffin wax, fatty acids (e.g. C14-C22), fatty acid amides, hydrophobic silica, carbodiimides, carbamate, polyethylene wax dispersion, and other additives known to the skilled artisan.

Existing roofing underlayment have very high total weights (above 40 oz/yd2) and are heavy to carry. The present article can have a weight of below 36 oz/yd 2 or below 26 oz/yd2.

EXAMPLE

The characteristics and composition parameters of the Example is set forth in the following Table 1.

TABLE 1

| | | | |
|---|---|---|---|
| WEIGHT BY ROLL, lbs. | 48 | 55 | |
| THICKNESS, mils. | 34 | 40 | PSTC-133 |
| USEABLE TEMPERATURE RANGE, ° F. (° C.) | 20° (−12°) | 176° (80°) | AAMA 711-13, 53 & 5.5 |
| NAIL SEALABILITY | Pass | | ASTM D 1970-17 |
| UV RESISTANCE, lbs./in. | 1.5 | | AAMA 711-13, 5.4 |
| ACRYLIC ADHESIVE STRENGTH TO ZIP SYSTEM ® PANEL, lbs./in. | 1.5 | | AAMA 711-13, 5.3 |
| COMPOSITION REQUIREMENTS | | | |

| Three-layer system | Acrylic adhesive layer, styrene acrylic/calcium carbonate layer, and saturated polyester non-woven layer | | |
|---|---|---|---|
| | Min. Thickness | Target Thickness | Max Thickness |
| Acrylic Adhesive | 4.5 | 5.0 | 5.5 |
| Styrene Acrylic/Calcium Carbonate Layer | 10 | 12 | 14 |
| Polyester Non-Woven Layer | 18 | 21 | 24 |

The performance of the Example according to various test protocols is set forth in the following Table 2.

TABLE 2

| | | Example | | | Comparative | | |
|---|---|---|---|---|---|---|---|
| Testing parameter | Units | Avg | S | n | Avg | s | n |
| 90° Peel adhesion at 73° F. to OSB (ASTM D3330 method F) | Lbf/in | 3.8 | 0.4 | 15 | 4.6 | 0.2 | 5 |
| 90° Peel adhesion at 73° F. to plywood panel (ASTM D3330 method F) | Lbf/in | 6.3 | 1.1 | 7 | 6 | 0.5 | 5 |
| 90° Peel adhesion at 73° F. to underlayment backing (ASTM D3330 method F) | Lbf/in | 5.4 | 0.3 | 7 | 9.6 | 0.5 | 5 |
| 90° Peel adhesion at 73° F. to Anodized Aluminum (ASTM D3330 method F) | Lbf/in | 7.4 | 0.3 | 7 | 10.5 | 0.3 | 5 |
| 90° Peel adhesion to Anodized Aluminum at 73° F. (ASTM D3330 method F) after 80 Celsius exposure for 7 days. | Lbf/in | 12.8 | 0.4 | 3 | Melted, unable to register an adhesion | | 3 |
| 90° Peel adhesion to Anodized Aluminum at 73° F. (ASTM D3330 method F) after UV exposure per ASTM G154 cycle | Lbf/in | 10.4 | 0.2 | 3 | 10.4 | 0.3 | 3 |

TABLE 2-continued

| Testing parameter | Units | Example Avg | S | n | Comparative Avg | s | n |
|---|---|---|---|---|---|---|---|
| 90° Peel adhesion to Anodized Aluminum at 73° F. (ASTM D3330 method F) after 7 days water immersion. | Lbf/in | 7.0 | 0.7 | 3 | 15.5 | 0.4 | 3 |
| 90° Peel adhesion to Anodized Aluminum at 73° F. (ASTM D3330 method F) after 10 days Thermal Cycling −40° C. to 50° C. | Lbf/in | 7.3 | 0.4 | 3 | Melted, unable to register an adhesion | | |
| ASTM D4073 Notched Tensile MD | Lbf/in | 80.4 | 8.3 | 7 | 24.0 | 0.7 | 2 |
| ASTM D4073 Notched Tensile CD | Lbf/in | 84.2 | 5.3 | 7 | 28.8 | 1.1 | 2 |
| 90° Peel adhesion at 10° F. to OSB (ASTM D3330 method F) | Lbf/in | 2 | 0.3 | 15 | 0 | N/A | 5 |
| 90° Peel adhesion at 10 ° F. to plywood panel (ASTM D3330 method F) | Lbf/in | 3.3 | 0.5 | 7 | 0 | N/A | 5 |
| 90° Peel adhesion at 10° F. to underlayment backing (ASTM D3330 method F) | Lbf/in | 4.3 | 0.2 | 7 | 0 | N/A | 5 |
| Cold Temp. Flex (ASTM D1970-17) | visual | No cracking | N/A | 3 | No cracking | N/A | 3 |
| ASTM D1970-17a (ASTM D7349 protocol 4) 5" water with shingle | visual | No leakage | N/A | 2 | No leakage | N/A | 2 |
| AC48 4.4 Water ponding | Visual | No loss in water height | N/A | 2 | No loss in water height | N/A | 2 |
| Sealant Compatibility (ASTM D713-08) | Visual | No oozing/degradation | N/A | 4 | oozing observed | N/A | 4 |
| Tensile Strength (ASTM D1970 Tensile) MD | Lbf/in | 57.7 | 6.8 | 5 | 25.9 | 1.1 | 5 |
| Elongation (ASTM D1970 Tensile) MD | % | 53.2 | 2.7 | 5 | 344 | 19.8 | 5 |
| Tensile Strength (ASTM D1970 Tensile) CD | Lbf/in | 57.6 | 2.7 | 5 | 29.7 | 0.9 | 5 |
| Elongation (ASTM D1970 Tensile) CD | % | 48.1 | 1.8 | 5 | 246 | 8.2 | 5 |
| PSTC-107 Shear to Steel at 73° F. at 1000 g weight | minutes | 205 | 100 | 7 | TBD | N/A | |
| PSTC-107 Shear to Steel 150° F. at 500 g weight | minutes | 75 | 60 | 7 | TBD | N/A | |
| Elemdorf Tear MD | g | >1400 | N/A | 7 | >1600 | N/A | 3 |
| Elemdorf Tear CD | g | >1400 | N/A | 7 | >1600 | N/A | 3 |
| ASTM D1894 Coefficient of Friction | None | 1.1 | 0.07 | 5 | 0.8-1.0 | 0.9 | 5 |

The adhesion performance of the Example to various substrates at either 73° F. or 10° F. is depicted in Tables 3 and 4 (90° adhesive in lb/in.)

TABLE 3

| 73° F. | 6 mil adhesive | 5 mil adhesive |
|---|---|---|
| OSB | 3.3 | 3.7 |
| Plywood | 5.3 | 6.0 |
| Green ZIP | 2.7 | 2.1 |
| Red ZIP Panel | 2.6 | 2.1 |
| Anodized Aluminum | 8.0 | 2.6 |
| Underlayment to Selfwound Zip | 3.6 | 2.6 |
| Underlayment to Linered Zip | 8.6 | 6.0 |
| Underlayment to Underlayment | 5.0 | 5.0 |
| Selfwound Zip to Underlayment | 5.7 | 5.0 |
| Linered Zip to Underlayment | 4.7 | 4.1 |

TABLE 4

| 10° F. | 6 mil adhesive | 5 mil adhesive |
|---|---|---|
| OSB | 1.9 | 1.8 |
| Plywood | 3.8 | 3.1 |
| Green ZIP | 0.7 | 1.1 |
| Red ZIP | 0.9 | 1.3 |
| Underlayment on Self Wound ZIP Tape | 1.1 | 2.3 |
| Underlayment on Linered ZIP Tape | 4.8 | 4.7 |
| Underlayment Backing to self | 3.1 | 3.8 |
| Self Wound ZIP Tape on Underlayment | 2.1 | 2.5 |
| Linered ZIP Tape on Underlayment | 1.9 | 2.1 |

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. An air and water barrier article comprised of multiple layers, said layers comprised of a polymeric layer comprised of styrene acrylic polymer and/or styrene butadiene polymer and/or ethylene vinyl acetate polymer and a filler, a porous layer comprised of a nonwoven polypropylene and/or polyester, optionally including fiberglass, carbon fiber nylon fiber, and/or acrylic fiber and including a polymeric saturant comprised of a water dispersed polymer selected from styrene butadiene rubber, acrylic polymer, ethylene vinyl acetate, nitrile rubber, PTFE, polychloroprene, EPDM, and/or polyvinylidene fluoride, the polymeric layer and the polymeric saturant being different polymers, the polymeric layer disposed on a side of the porous layer, and a pressure sensitive adhesive disposed on a side of the polymeric layer opposed to the porous layer, the polymeric layer and the porous layer being comprised of a material having a Tg between −40° C. and 40° C., and wherein said barrier article has nail sealability satisfying ASTM D-1970/D-1970 M-13 and has a weight of less than 40 ounces per square yard.

2. The barrier article of claim 1 in the form of a roll.

3. The barrier article of claim 1 wherein the polymeric saturant and/or the polymeric layer further includes a crosslinking agent and a hydrophobic additive.

4. An air and water barrier article comprised of multiple layers, said layers including a porous intermediate layer comprised of a saturated polypropylene and/or polyester wherein the saturation polymer comprises a water based polymer dispersion with the polymer selected from styrene acrylic polymer, styrene butadiene polymer, nitrile rubber, PTFE, polychloroprene, and/or polyvinylidene fluoride, a first polymeric layer disposed on a front side of the porous layer, a second polymeric layer disposed on a back side of the porous layer, and a pressure sensitive adhesive disposed on a side of the second polymeric layer opposed to the porous layer, each of the polymeric layers and the porous layer being comprised of a material having a Tg between −40° C. and 40° C., wherein the first polymeric layer includes a crosslinking agent, a hydrophobic additive and no filler, and the second polymeric layer includes a crosslinking agent, a hydrophobic additive and a filler, wherein the saturation polymer and the polymers forming the first polymeric layer and the second polymeric layer are different, and wherein said barrier article has nail sealability satisfying ASTM D-1970/D-1970 M-13 and has a weight of less than 40 ounces per square yard.

5. The barrier article of claim 4 wherein the first polymeric layer is hydrophobic.

6. The barrier article of claim 4 wherein the first and second polymeric layers are comprised of at least one of styrene acrylic polymer, styrene butadiene rubber, ethylene vinyl acetate.

7. The barrier article of claim 4 wherein the first polymeric layer further includes at least one of a UV absorber and a fire retardant.

8. An air and water barrier article comprised of multiple layers, said layers including a top layer comprised of styrene acrylic polymer having water repellency, UV resistance, slip resistance, crosslinking agent, hydrophobic agent and, an intermediate layer comprised of styrene acrylic polymer or styrene butadiene polymer including a filler and having a Tg between −40 and −15° C., a saturated non-woven layer comprised of a non-woven or fleece material saturated with styrene-butadiene rubber or ethylene-vinyl acetate polymer and having a Tg between 40 and −40° C., and a pressure sensitive adhesive.

9. The article of claim 8 wherein at least one layer does not include a filler.

10. The article of claim 9 wherein each layer includes a crosslinking agent and a hydrophobic additive.

11. The article of claim 8 wherein the saturation polymer, a polymer forming the top layer, and the intermediate layer polymer are the same polymer.

* * * * *